United States Patent
Reial et al.

(10) Patent No.: US 8,498,640 B2
(45) Date of Patent: Jul. 30, 2013

(54) FAST RADIO ACCESS TECHNOLOGY DETECTION FOR CELL SEARCH

(75) Inventors: Andres Reial, Malmö (SE); Niklas Andgart, Södra Sandby (SE); Bengt Lindoff, Bjärred (SE); Lennart Moren, Båstad (SE); Anders Wallén, Ystad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 214 days.

(21) Appl. No.: 13/076,599

(22) Filed: Mar. 31, 2011

(65) Prior Publication Data
US 2012/0252446 A1 Oct. 4, 2012

(51) Int. Cl.
*H04W 4/00* (2009.01)
(52) U.S. Cl.
USPC ......... 455/434; 455/435.2; 455/436; 455/515
(58) Field of Classification Search
USPC ................ 455/434, 161.1, 435.2, 436–439, 455/515
See application file for complete search history.

(56) References Cited

U.S. PATENT DOCUMENTS

| | | | |
|---|---|---|---|
| 8,081,922 B2 * | 12/2011 | Simic et al. | 455/3.02 |
| 2006/0009216 A1 | 1/2006 | Welnick et al. | |
| 2007/0091785 A1 | 4/2007 | Lindoff et al. | |
| 2010/0091674 A1 * | 4/2010 | Sjogren et al. | 370/252 |
| 2010/0222056 A1 | 9/2010 | Wu | |
| 2011/0207453 A1 * | 8/2011 | Hsu et al. | 455/424 |
| 2011/0211504 A1 * | 9/2011 | Feuersanger et al. | 370/310 |
| 2011/0263255 A1 * | 10/2011 | Alonso-Rubio et al. | 455/436 |
| 2013/0017828 A1 * | 1/2013 | Weng et al. | 455/434 |

FOREIGN PATENT DOCUMENTS

| | | |
|---|---|---|
| EP | 2066043 | 6/2009 |
| WO | 2008057898 A2 | 5/2008 |
| WO | 2009039211 A1 | 3/2009 |
| WO | 2009068620 | 6/2009 |

OTHER PUBLICATIONS

Bahl, Sanat Kamal, "Cell Searching in WCDMA," IEEE Potentials, Apr./May 2003, pp. 16-19.
PCT International Search Report, dated Feb. 27, 2009, in connection with International Application No. PCT EP2008/066356.

* cited by examiner

*Primary Examiner* — Cong Tran
(74) *Attorney, Agent, or Firm* — Coats and Bennett, P.L.L.C.

(57) ABSTRACT

Methods and apparatus are provided for detecting the radio access technology (RAT) employed in a received signal prior to performing a cell search. The RAT detection method may be used to identify the most likely RAT employed for each candidate frequency identified in an initial frequency scan. Once the most likely RAT is identified, the mobile communication device can then attempt synchronization according to the procedures for the most likely RAT. Identifying the RAT prior to the cell search reduces the number of synchronization attempts and, consequently, the time needed to perform the cell search.

22 Claims, 10 Drawing Sheets

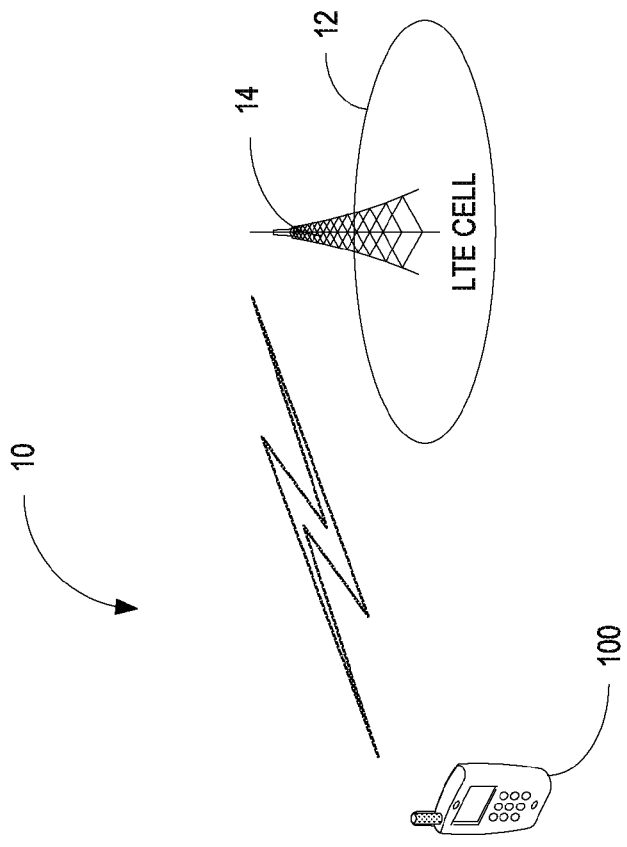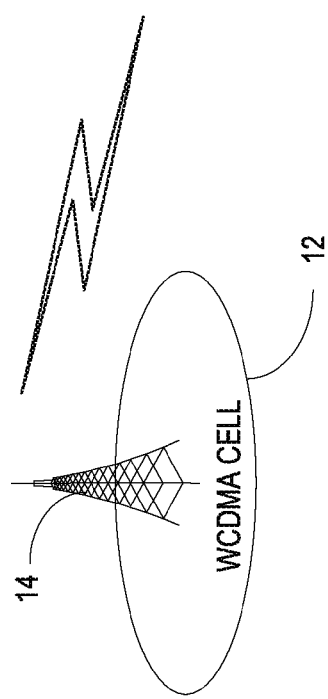
Fig. 1

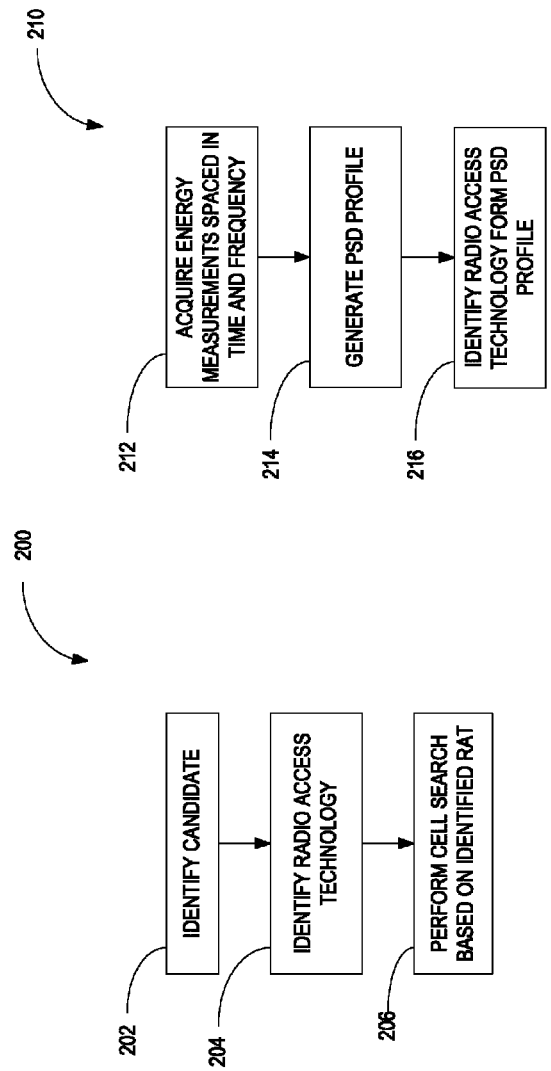

FAST RADIO ACCESS TECHNOLOGY DETECTION FOR CELL SEARCH

BACKGROUND

The invention disclosed herein relates generally to cell search procedures for dual mode communication devices and, more particularly, to the detection of a radio access technology for a cell.

In order for a wireless communication device to connect with a communication network, the wireless communication device needs to find and acquire synchronization with a cell within the network, read system information from a broadcast channel in the cell, and perform a random access procedure to establish a connection with the cell. The first of these steps is commonly referred to as cell search. A cell search is typically performed on power-up when initially accessing the network. Additionally, mobile communication devices may perform a cell search after attaching to a network to identify candidate target cells for a hand over.

The details of a cell search will depend on the underlying radio access technology (RAT). In general, the cell search can be divided into three basic steps: (1) acquiring frequency and time synchronization; (2) acquiring frame timing of the cell, i.e., determining the start of the downlink frame; and (3) determining the identity of the cell. Typically, the base station transmits one or more synchronization signals. The mobile communication device scans a frequency band of interest and correlates the received signal with a primary synchronization signal. When a cell is detected, the mobile communication device performs time and frequency synchronization and determines the cell identity.

The problem of cell search becomes more complicated for dual mode or multi-mode communication devices that operate in frequency bands that deploy a mix of RATs. In such mixed environments, base stations may transmit signals of varying bandwidth in different frequency regions within the same frequency band. One example of such a mixed environment comprises a first group of base stations operating according to the Wideband Code Division Multiple Access (WCDMA) standard and a second group of base stations operating according to the Long-Term Evolution (LTE) standard. In order to perform a cell search on a candidate carrier frequency, the mobile communication device needs to know the correct RAT because different RATs have different cell search procedures.

A blind detection approach can be used to perform a cell search. With a blind detection approach, the mobile communication device scans a frequency band of interest and measures the received energy on a plurality of candidate frequencies. For each candidacy frequency, the mobile communication device successively attempts synchronization using different RATs until the synchronization is obtained. With the blind detection approach, the time needed to perform a cell search increases dramatically as the number of possible frequencies and RATs grows. Therefore, new techniques for identifying the RAT of a cell are needed to reduce the amount of time needed to perform cell search in heterogeneous networks employing a mix of RATs.

SUMMARY

The invention disclosed herein provides methods and apparatus for detecting the radio access technology (RAT) employed in a received signal prior to performing a cell search. The RAT detection method may be used to determine the most likely RAT employed for each candidate frequency identified in an initial frequency scan. Once the RAT is determined, the mobile communication device can then attempt synchronization according to the procedures for the most likely RAT. Identifying the RAT prior to the cell search reduces the number of synchronization attempts and, consequently, the time needed to perform the cell search.

To perform RAT detection, a Fast Fourier Transform (FFT) or other transform is applied to each candidate signal to transform the signal into the frequency domain and to obtain a series of energy measurements spaced in time and frequency. The mobile communication device accumulates the energy measurements into predetermined time frequency bins to obtain cumulative energy measurements corresponding to each time frequency bin. The mobile communication device evaluates the cumulative energy measurements in the time frequency bins to identify the RAT. In one exemplary embodiment, the mobile communication device distinguishes between WCDMA signals and LTE signals based on a variance of the cumulative energy measurements in the time frequency bins. According to another embodiment of the invention, the mobile communication device distinguishes between a WCDMA signal and LTE signal based on a peak-to-minimum or peak-to-average ratio of the cumulative energy measurements. In another embodiment, the mobile communication device distinguishes between a WCDMA signal and LTE signal based on the power spectrum density profile.

Exemplary embodiments of the invention comprise methods of determining the RAT employed in a received signal, which method may be used prior to performing a cell search. One exemplary method comprises acquiring, from a received signal, a plurality of energy measurements spaced in time and frequency. Each energy measurement corresponds to one resource element of a time-frequency grid. The method further comprises accumulating said energy measurements into predetermined time-frequency bins to obtain cumulative energy measurements corresponding to each time-frequency bin, and identifying a RAT associated with the received signal based on a distribution of the cumulative energy measurements in said time-frequency bins.

Other embodiments of the invention comprise a mobile communication device that can detect a RAT prior to performing a cell search. One exemplary mobile communication device comprises a transceiver circuit for communicating with a base station in a mobile communication network, and a control circuit for determining the RAT of a signal received by said transceiver circuit. The control circuit comprises a processor configured to acquire from the received signal a plurality of energy measurements spaced in time and frequency. Each energy measurement corresponds to one resource element of a time-frequency grid. The processor is further configured to accumulate said energy measurements into predetermined time-frequency bins to obtain cumulative energy measurements corresponding to each time-frequency bin, and to identify the RAT of said received signal based on a distribution of said cumulative energy measurements in the time-frequency bins.

The RAT detection method described herein makes it possible to quickly distinguish between different RATs without requiring a blind synchronization attempt for each possible candidate RAT.

BRIEF DESCRIPTION OF THE DRAWINGS

FIG. 1 illustrates a heterogeneous network using two or more different radio access technologies.

FIG. 2 illustrates a combined radio access technology detection and cell search procedure for a network having a mix of radio access technologies.

FIG. 3 illustrates a radio access technology detection method based on power spectral density profiles.

DETAILED DESCRIPTION

Figure 4:
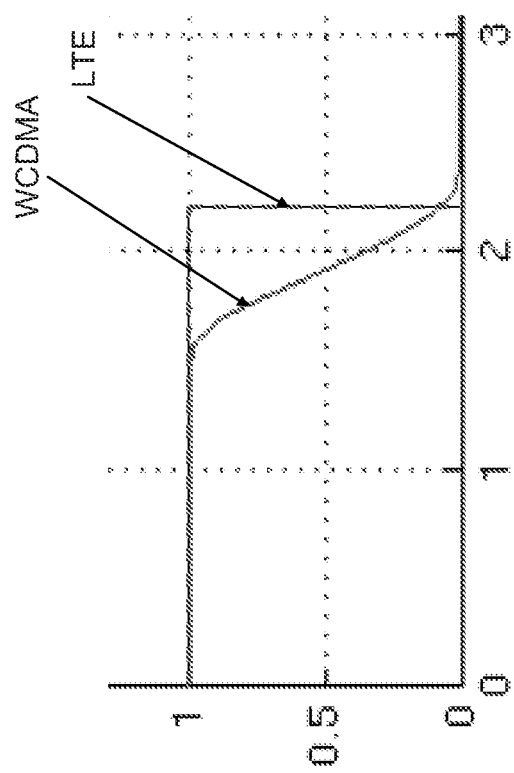
FIG. 4 illustrates and compares the power spectral density profiles for a WCDMA and LTE signal.

Referring now to the drawings, FIG. 1 illustrates a mobile communication device 100 operating in a heterogeneous network 10 using a mix of different radio access technologies (RATs). The coverage area of the network 10 is divided into a plurality of cells 12. A base station 14 within each cell provides service to mobile communication devices 100 within the cell 12. Different base stations 14 may use different RATs to communicate with the mobile communication devices 100. In the exemplary embodiment described herein, a first one of the cells 12 operates according to the Long-Term Evolution (LTE) standard and is referred to herein as the LTE cell 12. A second cell 12 operates according to the Wideband Code Division Multiple Access (WCDMA) standard and is referred to herein as the WCDMA cell 12. The mobile terminal 100 is a dual mode or multi-mode communication terminal capable of operating according to both the LTE and WCDMA standards. Those skilled in the art will appreciate that the cells 12 could use other radio access technologies and that the invention described herein is not limited to networks employing only WCDMA and LTE protocols.

On initial power up, mobile communication device 100 needs to perform a cell search in order to locate and synchronize to a cell 12 providing coverage in the geographic area where the mobile communication device 100 is located. Before beginning a cell search, the mobile communication device 100 may scan a frequency band of interest to identify one or more carrier frequencies transmitted from neighboring cells 12. The mobile communication device 100 then performs a cell search. The cell search typically comprises three basic steps. First, the mobile communication device 100 acquires time and frequency synchronization to the cell. Second, the mobile communication device 100 acquires the frame timing of the cell. Third, the mobile communication device 100 determines the cell identify of the cell.

In communications networks 10 employing different RATs in different cells 12, the mobile communication device 100 needs to identify the RAT to perform a successful cell search. Identifying the RAT can be problematic. For example, a 5 MHz WCDMA carrier and a 5 MHz LTE carrier may occupy the same frequency spectrum and have the same frequency bandwidth. Similarly, several adjacent WCDMA carriers could be confused with 10 or 20 MHz LTE carriers. A blind detection approach could be used to identify the RAT. With the blind detection approach, the mobile communication device 100 performs a cell search based on a hypothesized RAT and attempts to acquire synchronization with the cell 12. If the attempt to synchronize with the cell 12 fails, the mobile communication device 100 then attempts to acquire synchronization based on another hypothesized RAT. The likelihood that the initial hypothesis is correct is only 50% in this example. Where the initial hypothesis is not correct, it will take more time for the mobile communication device 100 to acquire synchronization.

The invention disclosed herein provides a RAT detection method to determine the most likely RAT for an identified carrier before beginning a cell search. The RAT detection method is based on the observation that the signal patterns associated with different RATs will be different, and that the most likely RAT can be identified by recognizing characteristics in the signal pattern.

FIG. 2 illustrates how the RAT detection procedure is used in the context of a cell search at initial power up. When the mobile communication device 100 is powered on, the mobile communication device 100 performs a frequency scan in a frequency band of interest to identify one or more candidate carrier frequencies in neighboring cells 12 (block 202). The frequency scan can be accomplished, for example, based on a power spectral density (PSD) profile. For each identified carrier, the RAT detection procedure is used to identify the most likely RAT for the carrier (block 204). A cell search is then performed in accordance with the identified RAT (block 206).

FIG. 3 illustrates an exemplary RAT detection procedure 210 based on the PSD profile of the signal. To begin the RAT detection procedure 210, the mobile communication device 100 acquires a series of energy measurements spaced in time and frequency from the received signal on an identified carrier frequency (block 212). The measurements may be acquired, for example, by taking a series of Fast Fourier Transform (FFT) snapshots. In some embodiments, the same FFT snapshots used for carrier identification may also be used for RAT detection. In other embodiments, a new set of FFT snapshots may be taken. The FFT snapshots are averaged over a predetermined time period to obtain the power spectral density (PSD) profile of the received signal (block 214). The RAT is then determined on the basis of the obtained PSD (block 216). More particularly, the obtained PSD profile is compared to a known PSD profile for each RAT and a metric is generated based on the comparison. The PSD profile that produces the best metric is identified as the most likely RAT.

FIG. 4 illustrates how the RAT detection method based on PSD profile can be used to distinguish between a WCDMA signal and a 5 MHz LTE signal. Both the WCDMA and LTE signals occupy approximately the same bandwidth. Therefore, the signals may not easily be distinguished on the basis of bandwidth alone. However, looking more closely, the WVDMA signal characterized by a root-raised cosine spectrum with a chip rate of 3.84 Mchips/s. In contrast, pulse-shaping is not used in the LTE signal, which has a rectangular bandwidth of approximately 4.5 MHz, slightly wider than the −3 dB BW of the WCDMA signal. Therefore, it is possible to distinguish a WCDMA signal from a 5 MHz LTE signal by examining the PSD profile at the edge of the bandwidth. The power spectral densities depicted in FIG. 4 illustrate nominal signals at the base station transmitter. Before the signals are received at the mobile terminal, the signals will be subject to a propagation channel, and thus the received power spectral density may exhibit more variations both in time and frequency.

If the resolution of the frequency scan is too low, it may be difficult to distinguish the profiles of the WCDMA signal from the profile of the 5 MHz LTE signal. A number of techniques can be used to increase the frequency accuracy and frequency resolution to ensure reliable detection. The most straight-forward approach is to use more time averaging of the FFT snapshots in order to reduce the variance of the PSD estimate. More averaging yields better accuracy. One downside of this approach is that the increased averaging increases the RAT detection time, and consequently increases the cell search time.

The frequency resolution may also be increased by varying the sampling frequency for the FFT. As an example, if a 2,048 point FFT is used with a 15.36 MHz sampling rate, the resulting periodgram will have a 7.5 kHz spacing instead of the conventional 15 kHz spacing used in LTE signals. To avoid aliasing, low pass filtering can be applied to the sample sequence before downsampling. The anti-alias filtering and frequency shifts can be performed in the frequency domain as follows:

1) perform FFT at standard resolution;
2) apply frequency domain filter and shift;
3) perform inverse FFT at standard resolution to convert to time domain;
4) downsample; and
5) perform FFT on downsampled signal.

The effective center frequency of the original sample sequence may be moved to the edge of the band of interest by multiplying with a complex exponential in the time domain prior to downsampling in order to zoom into the PSD region of interest.

Instead of changing the sample rate (downsampling), the effective resolution of the FFT may be changed by executing a double length FFT on the original sample sequence. In this case, there is no need for anti-alias filtering.

Figure 5:
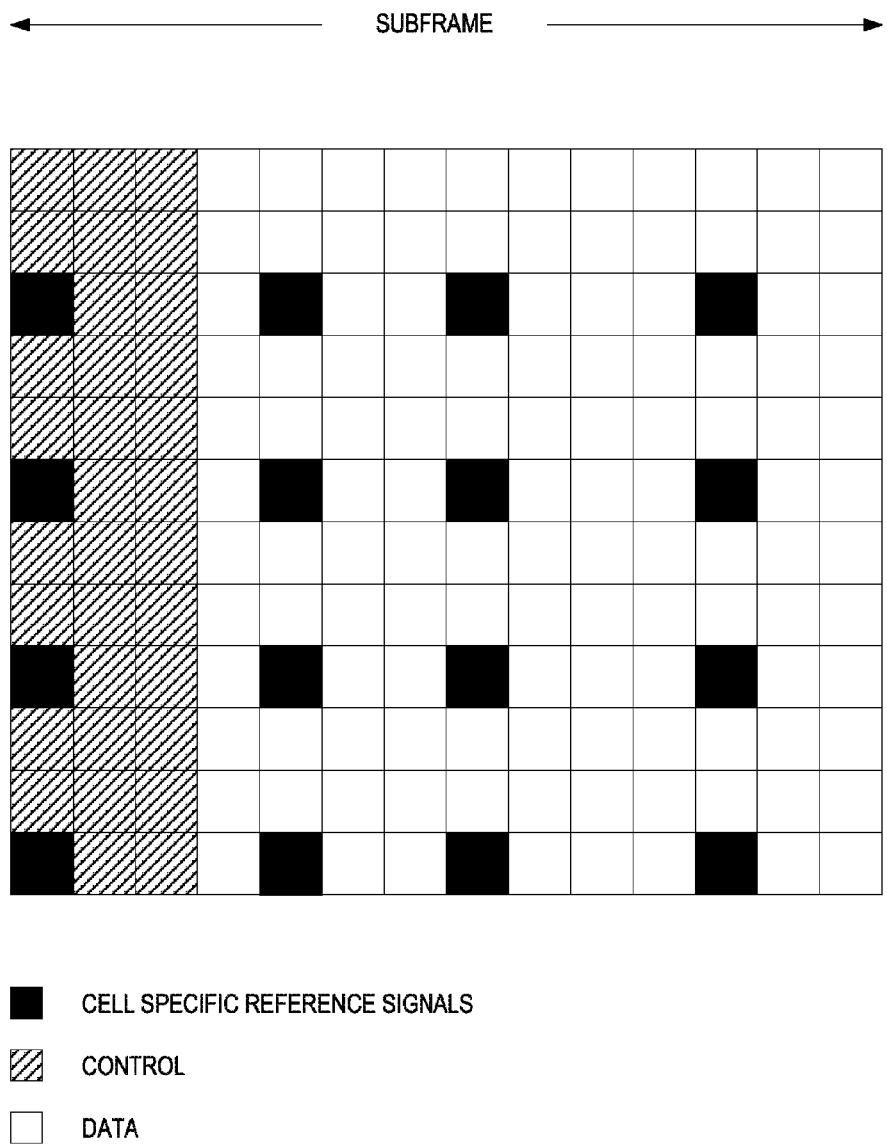
FIG. 5 illustrates a time-frequency grid for an LTE system.

Other embodiments of the invention take advantage of the fact that the energy distribution in an LTE signal is less uniform than the energy distribution in a WCDMA signal. In an LTE system, the resources can be represented as a time-frequency grid as shown in FIG. 5. The time-frequency grid is divided into 1 ms subframes. Each subframe includes a number of OFDM symbols. For a normal cyclic prefix (CP) length, suitable for use in situations where multipath dispersion is not expected to be extremely severe, a subframe comprises fourteen OFDM symbols. A subframe comprises twelve OFDM symbols if an extended cyclic prefix is used. In the frequency domain, the physical resources are divided into adjacent subcarriers with a spacing of 15 kHz. The smallest element of the time-frequency grid is a resource element. A resource element comprises one OFDM subcarrier during one OFDM symbol interval. Time-frequency resources are allocated in units called resource blocks (RBs). Each resource block spans twelve subcarriers (which may be adjacent or distributed across the frequency spectrum) and one 0.5 ms slot (one half of one subframe). At any given time, some resource blocks may be unallocated, so the energy distribution will not be uniform. Also, as shown in FIG. 5, cell specific reference signals are transmitted on designated subcarriers in the first, fifth, eighth, and twelfth subframes even when the resource block is not allocated. Thus, the average energy for resource elements corresponding to the cell specific reference signals will be higher than other resource elements.

Figure 6:
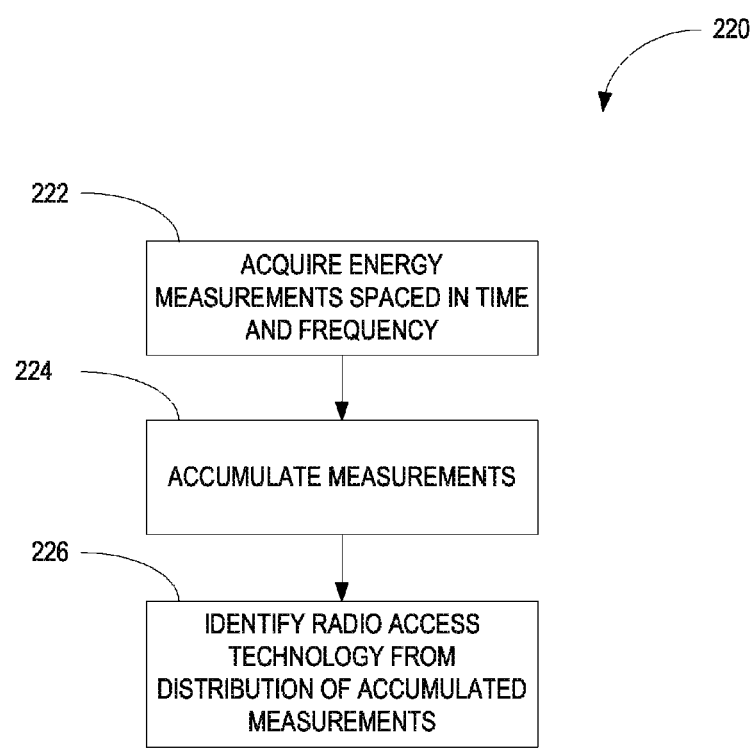
FIG. 6 illustrates a radio access technology detection based on distribution of cumulative energy measurement.

FIG. 6 illustrates an alternate RAT detection procedure 220 according to one embodiment. To begin the RAT detection procedure 220, the mobile communication device 100 acquires a series of energy measurements spaced in time and frequency from the received signal on an identified carrier frequency (block 222). The energy measurements may be acquired, for example, by taking a series of FFT snapshots with a predetermined frequency and time resolution. Those skilled in the art will appreciate that the same FFT snapshots may be used for both the detection of the carrier frequencies and the RAT detection. In other embodiments, a different set of FFT snapshots may be used for carrier frequency detection and RAT detection.

After the energy measurements are acquired, the energy measurements are grouped and accumulated in corresponding time frequency bins to obtain cumulative energy measurements for each group (block 224). That is, the energy measurements within each group are accumulated or summed in a corresponding time-frequency bin to obtain the cumulative energy measurements. The final step in the RAT detection procedure is to identify the RAT from the distribution of the cumulative energy measurements in the time frequency bins (block 226). It is assumed that the distribution of the cumulative energy measurements will be different for different RATs. By analyzing the distribution of the cumulative energy measurements, it is therefore possible to identify the most likely RAT.

In exemplary embodiments, a detection metric is derived from the cumulative energy measurements. The detection metric can be designed to detect a characteristic energy distribution pattern for one of the possible RATs. In effect, the detection metric is a measure of how well the distribution of the cumulative energy measurements matches the expected distributions for one of the RATs. Examples of detection metrics include the variance of the cumulative energy measurements, and the peak-to-minimum or peak-to-average ratios of the cumulative energy measurements, and metrics reflecting the presence of certain spectral features. The latter may, for example, comprise the deviation from the raised-cosine spectrum with a given roll-off, evaluated as the difference between the observed and the reference spectral responses after normalization. The detection metric is compared to a detection threshold, which is selected to obtain a desired probability of correctly detecting the most likely RAT. The RAT is identified on the basis of the comparison. In the simple case involving two possible RATs (e.g., WCDMA and LTE), the RAT detection function may determine that the RAT of a cell 12 is a first type (e.g. WCDMA) when the detection metric is less than the threshold and a second type (e.g., LTE) when the detection metric is greater than the threshold. To improve detection performance, the threshold can be made dependent on parameters other than the energy distribution, such as the estimated SNR, speed, or prior probabilities of WCDMA or LTE deployment densities.

The search grid for the RAT detection is a time-frequency grid. In one exemplary embodiment, the energy measurements have a spacing of 15 kHz in the frequency domain and 66.7 μs in the time domain. Each unit in the search grid is referred to herein as a resource element. Each energy measurement corresponds to one resource element of the search grid. The resource elements in the search grid can be grouped into blocks referred to herein as resource blocks. In the exemplary embodiment, a resource block in the search grid has the same dimensions as the LTE resource block. That is, a resource block comprises 180 kHz in the frequency domain and 1 ms in the time domain. While it is convenient if the resource block size for RAT detection in the exemplary embodiment corresponds with the LTE resource block, such condition is not necessary. That is, the search grid may use resource blocks with different dimensions than those of an LTE time-frequency grid.

As will be described in more detail below, the energy measurements are grouped together and the energy measurements in each group are summed or accumulated in a respective time-frequency bins to obtain the cumulative energy measurements. It is assumed that the total energy is more evenly distributed in a WCDMA signal as compared to an LTE signal. Therefore, the distribution of the cumulative energy measurements in the time frequency bins can be used to distinguish a WCDMA signal from an LTE signal.

Figure 7:
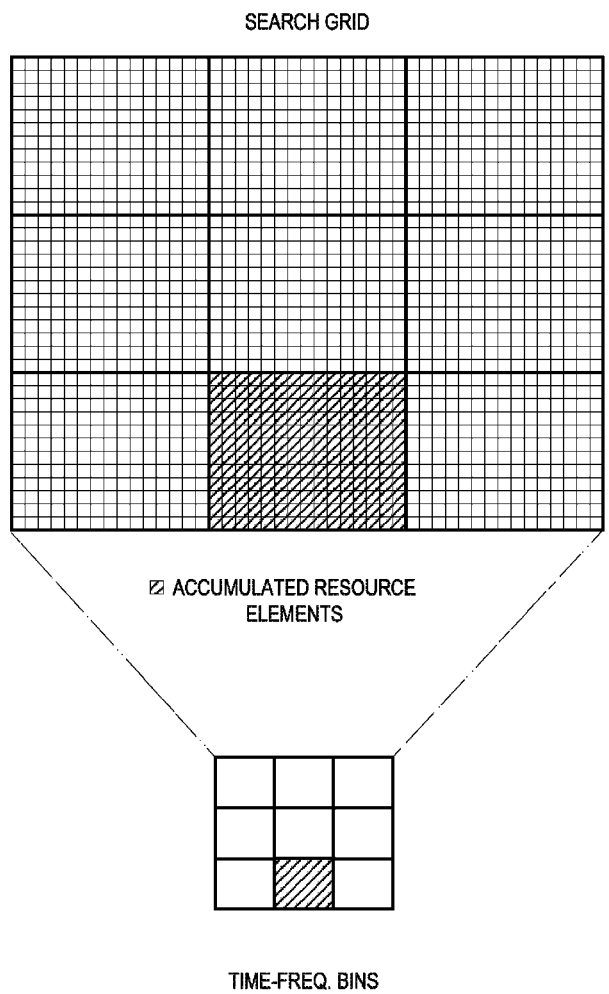
FIG. 7 illustrates a first accumulation technique for radio access technology detection.

In one exemplary embodiment, illustrated in FIG. 7, all of the energy measurements corresponding to one resource block in the search grid are summed or accumulated into a respective time-frequency bin. Each time-frequency bin corresponds to a respective resource block in the search grid. In this embodiment, the variance of the cumulative energy measurements is used as a detection metric to distinguish between a WCDMA and LTE signal. In a WCDMA signal, the total transmit energy is spread evenly across the bandwidth. In contrast, the energy will vary over resource blocks in an LTE signal. Therefore, a WCDMA signal will have a lower expected variance than an LTE signal. The variance of the cumulative energy measurements in the time frequency bins can be used as a metric and compared to a detection threshold to distinguish WCDMA and LTE signals.

In another embodiment of the invention, WCDMA and LTE signals are distinguished based on the difference in the lengths of the WCDMA slot and the LTE resource block. A slot in WCDMA is 0.667 ms, while the resource block in LTE is 1 ms. Two different metrics based on the slot/resource block timing can be compared against corresponding thresholds. The RAT is identified as the one with the best metric.

Figure 8:
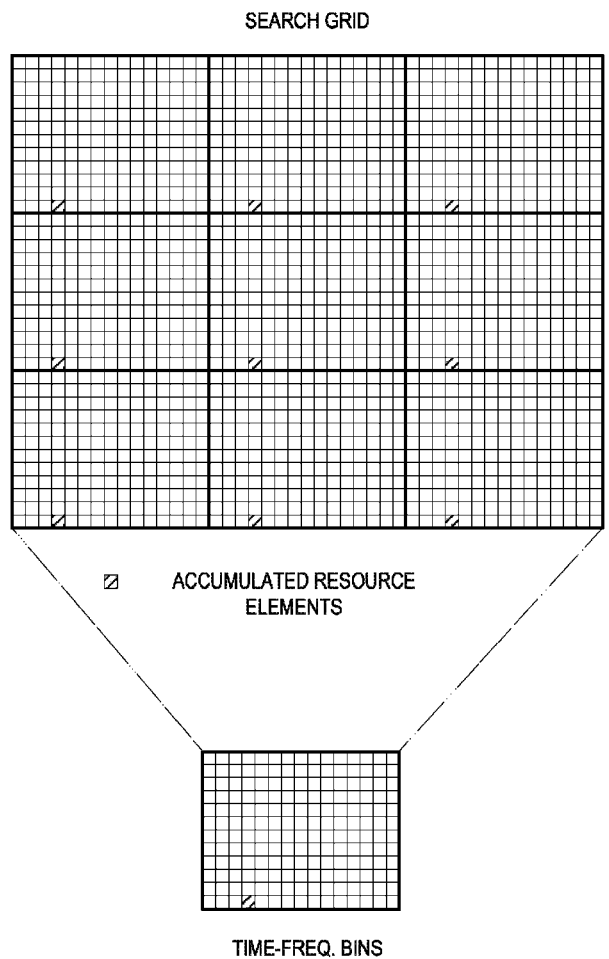
FIG. 8 illustrates a second accumulation technique for radio access technology detection.

In another embodiment, shown in FIG. 8, energy measurements corresponding to resource elements having the same time-frequency location in their respective resource blocks are summed or accumulated into a respective time-frequency bin. Each time-frequency bin corresponds to a time-frequency location within a resource block. In this embodiment, the peak-to-minimum or peak-to-average ratio of the cumulative energy measurements is used as a detection metric to distinguish between a WCDMA and LTE signal. In a WCDMA signal, the total transmit energy is spread evenly across the bandwidth. In contrast, an LTE signal will be characterized by peaks corresponding to the locations of reference signals in the LTE resource block. Therefore, a WCDMA signal will have a lower peak-to minimum ratio (PMR) or peak-to-average ratio (PAR) than an LTE signal. The PMR or PAR of the cumulative energy measurements in the time frequency bins can be used as a metric and compared to a threshold to distinguish WCDMA and LTE signals. Alternatively, the LTE signal could be identified by correlating the peaks in the cumulative energy measurements to known reference signal patterns in the LTE signal. A metric may be used to determine how well the detected peaks match the LTE reference signal pattern.

Figure 9:
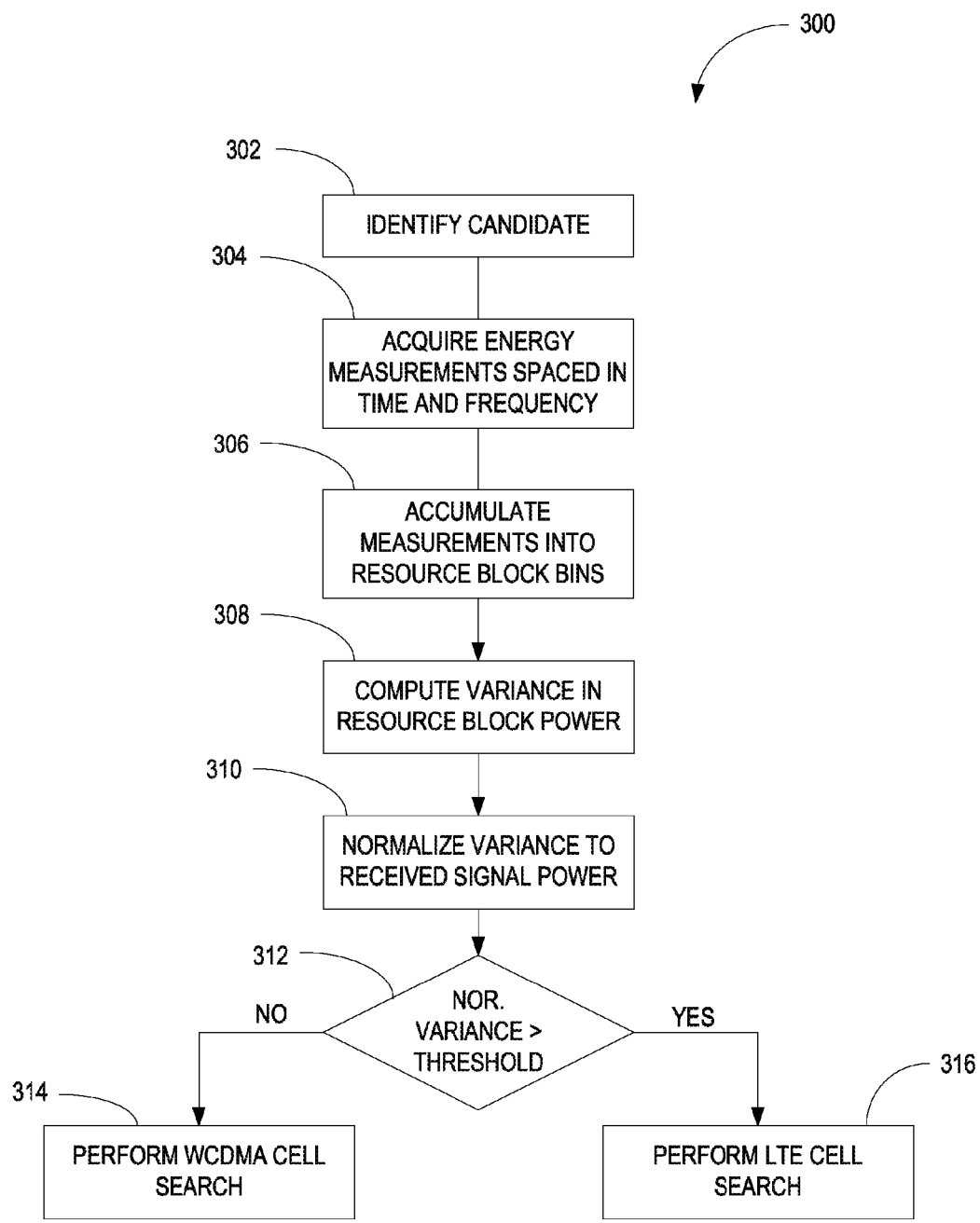
FIG. 9 illustrates a radio access technology detection method using the first accumulation technique.

FIG. 9 illustrates a procedure 300 incorporating a RAT detection method as shown in FIG. 6. This embodiment uses the accumulation technique shown in FIG. 7. This exemplary procedure 300 looks at the variation in time and frequency over the entire signal.

To begin the procedure 300, the mobile communication device 100 identifies candidate frequencies by performing a series of FFT scans as previously described (block 302). Once the candidate frequencies are identified, the RAT detection procedure (blocks 304-312) is used to determine the most likely RAT for the candidate. More particularly, the mobile communication device 100 acquires a series of energy measurements spread in time and frequency (block 304). As previously noted, the same FFT snapshots may be used for both the detection of the carrier frequencies and the RAT detection. Alternatively, a new set of FFT snapshots with the same or different resolution may be performed to generate energy measurements for RAT detection. The subcarrier associated with the estimated carrier center frequency can be removed after the FFT snapshots are taken.

After the energy measurements are taken, the measurements are accumulated into resource block bins (as shown in FIG. 7) (block 306). A variance of the cumulative energy measurements is then computed (block 308). The estimated variance gives an indication of the variance in energy levels over both time and frequency. In some embodiments, the variance may be normalized to the receive signal power (block 310). The normalized variance is then compared to the detection threshold (block 312). In this example, the detection threshold is the maximum variance that would be expected for a WCDMA signal. If the normalized variance is below the detection threshold, it is presumed that the signal is a WCDMA signal and a WCDMA cell search is performed (block 314). If the normalized variance is greater than the threshold, it is assumed that the signal is an LTE signal and an LTE cell search is performed (block 316).

In one exemplary embodiment, the mobile communication device 100 captures 150 FFT snapshots over a 10 ms time period (10 resource blocks in the time domain). The FFT snapshot spans 300 subcarriers (25 resource blocks in the frequency domain). As described above, the energy measurements corresponding to one resource block are accumulated into one time-frequency bin. However, because subframe timing in the LTE system is not known, there are 15 potential starting points for the resource block in the time domain. To find the correct timing, all 15 possible starting points may be tested to obtain a 25×10 matrix where each matrix element corresponds to one time-frequency bin. The variance of the 250 cumulative measurements is then determined and compared the detection threshold as previously described. The hypothesis testing can be performed without having to store the full 300×150 measurements by using length-25 accumulation vectors and calculating the variance recursively. As noted above, the estimated variance gives an indication of the variance over both time and frequency.

Delay spread and Doppler spread cause natural variations in both frequency and time. The variance calculation may be modified to compensate for such effects. For example, trends due to delay and Doppler spread can be removed from the 25×10 matrix before computing the variance. Alternatively, local variances for sets of neighboring elements can be computed and then the average taken over such variances to obtain a variance measure for the whole matrix.

Figure 10:
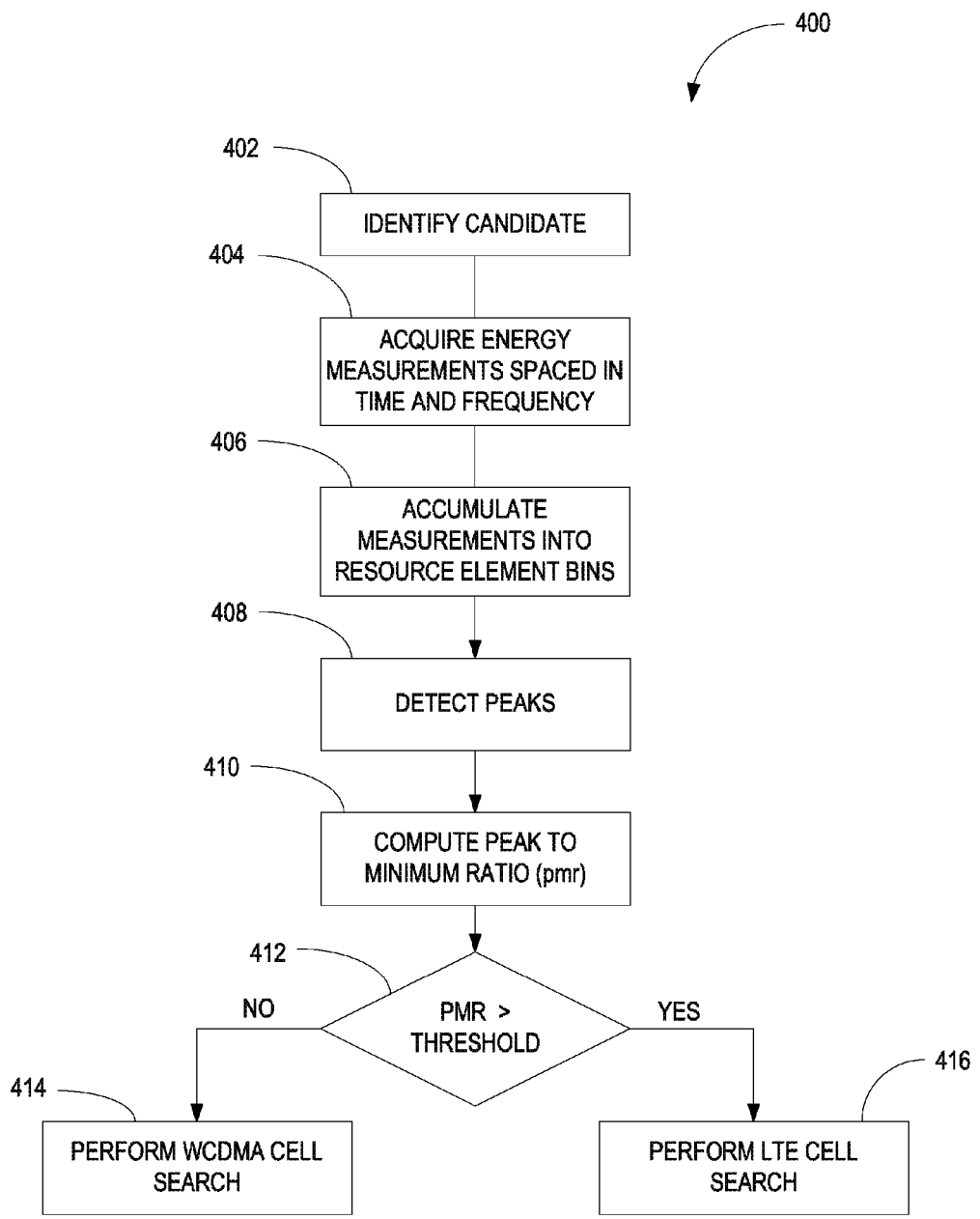
FIG. 10 illustrates a radio access technology detection method using the second accumulation technique.

FIG. 10 illustrates cell search procedure 400 incorporating an alternative RAT detection method. This embodiment is based on the knowledge of LTE reference signals at certain known intervals in the LTE time-frequency grid. In a lightly loaded cell, some resource blocks will not be allocated, so there will not be any data transmission in those resource blocks. However, the resource blocks will still have the pilots transmitted even when there is no data transmission.

To start the procedure, the mobile communication device 100 identifies one or more candidate frequencies (block 402). This embodiment uses the accumulation technique shown in FIG. 8. Before the cell search procedure begins, the RAT of the candidate frequency is identified (blocks 404-412). More particularly, the mobile communication device 100 acquires a series of energy measurements spaced in time and frequency. As previously described, the energy measures may be acquired by taking a series of FFT snapshots (block 404). The subcarrier associated with the estimated carrier center frequency can be removed after the FFT snapshots are taken. The energy measurements are then accumulated into resource element bins as shown in FIG. 8 (block 406). After accumulating the energy measurements, the mobile communication device 100 detects peaks in the energy measurements (block 408) and computes a peak-to-minimum ratio (PMR) (block 410). The PMR will typically be greater for an LTE signal than a WCDMA signal. Therefore, the PMR can be compared to a threshold to distinguish a WCDMA signal from an LTE signal (block 412). If the PMR is less than the threshold, it is presumed that the receive signal is a WCDMA signal and a WCDMA cell search is performed (block 414). On the other hand, if the PMR is greater than the threshold, it is assumed that the receive signal is an LTE signal and an LTE cell search is performed (block 416). Metric other than the PMR may be used. For example, it is possible to further exploit the regularities associated with expected patterns from e.g. LTE reference signals to generate additional metrics.

In one exemplary embodiment, the mobile communication device 100 captures 150 FFT snapshots over a 10 ms time period (10 resource blocks in the time domain). The FFT snapshot spans 300 subcarriers (25 resource blocks in the frequency domain). Thus, the measurements form a 300×150 matrix. As shown, in FIG. 8, the measurements are accumulated into time-frequency bins corresponding to time-frequency location in a resource block. Thus, the final cumulative measurements form a 12×15 matrix. Since there is a periodicity of 6 subcarriers in the pilot pattern, the two halves of the 12×15 matrix can be further summed into one 6×15 matrix. The peak-to minimum or peak-to-average ratio of the 6×15 matrix can then be computed and compared to the detection threshold.

Because the measurements are performed before the mobile communication device is synchronized with the network, there will likely be a large frequency offset. This will mean that any peak that should occur on one of the elements in a matrix column may be placed on two adjacent elements. To reconstruct the peak value, the matrix can be, (but not need to be) over sampled in the frequency direction. Oversampling from 6 to 24 points, can be done with sinc interpolation by a 6-point FFT followed by a 24-point IFFT.

The embodiments of the invention have been heretofore described in the context of distinguishing between two or more possible RATs, but may also be employed in order to discriminate between different configurations of the same basic RAT. One such practical example refers to carrier aggregation for LTE, as defined in the 3GPP standard Rel.10. For example, it is possible to aggregate two adjacent LTE carriers, of the same or different bandwidths, with a significantly reduced guard band or gap between the carriers. Even if the employed RAT may be the same, and thus the cell search procedure would be identical, it is important to distinguish between a single carrier and aggregated carriers because the synchronization signals are centered around different frequencies.

The introduction of carrier aggregation may cause difficulties in discriminating between, say, one 20 MHz LTE carrier, and two closely aggregated 10 MHz carriers. For this particular case, the smallest guard band allowed by the standard corresponds to 285 kHz (19 sub-carriers) instead of the nominal guard band of 1 MHz between two 10 MHz carriers. Other bandwidth combinations Visio-517847.pdf yield even smaller minimum allowed gap. One approach is to detect the gap using better accuracy and resolution in the PSD estimate, for example employing techniques described above.

In some embodiments of the invention, accumulation based on FIG. 7 can be used for the purpose of identifying aggregated carriers. When performing the energy accumulation for each resource block, there will be significant reduction in energy at the gap between the carriers, which can be exploited to detect that the received signal originates from aggregated carriers.

In other embodiments of the invention, accumulation based on FIG. 8 can be used for the purpose of identifying aggregated carriers. In these embodiments, expected peaks due to regular patterns associated with reference signals are exploited. For aggregated carriers, these patterns may or may not overlap between the carriers depending on the frequency shift used for each carrier. Thus, one possibility is to divide the resource blocks in groups defined by possible boundaries between aggregated carriers, and then evaluate the energy accumulation for groups of resource blocks.

Figure 11:
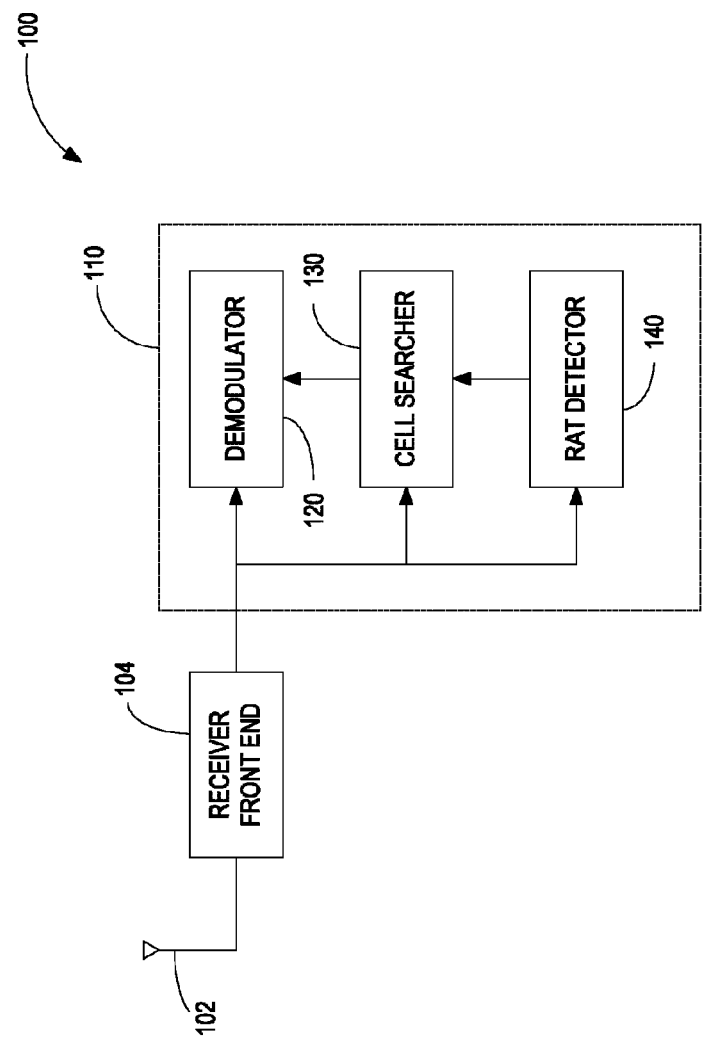
FIG. 11 illustrates an exemplary mobile communication device that implements the radio access technology detection method as herein described.

FIG. 11 illustrates an exemplary mobile communication device 100 according to one embodiment of the invention. The mobile communication device comprises an antenna 102, receiver front end 104, and processing or control circuit 110. The antenna 102 receives signals transmitted from the LTE and WCDMA base stations. The received signals are processed by the receiver front end 104. More particularly, the receiver front end filters, amplifies, and downconverts the receive signals to baseband frequency. The receiver front end 104 also converts the receive signal to digital form for processing by the processing circuit 110. The processing or control circuit 110 comprises a demodulator 120, cell searcher 130, and RAT detector 140. The function of the demodulator 120 is to demodulate the receive signals. The cell searcher 130 performs the cell searching operations as herein described. The RAT detector detects the RAT of a received signal and provides a detection signal to the cell searcher 130. The RAT detector 140 can reduce the time for cell search operations by providing the cell searcher 130 with the most likely RAT before cell search operations are performed.

The RAT detection method described herein makes it possible to quickly distinguish between different cellular RATs without requiring a blind synchronization attempt for each possible candidate RAT. It thus reduces the search complexity by immediately excluding the least likely RAT candidates and leads to a reduction in cell search time for mobile communication devices operating in frequency bands having a mix of RATs.

With the above variations and examples in mind, those skilled in the art will appreciate that the preceding descriptions of various embodiments of methods and apparatus are given only for purposes of illustration and example. One or more of the specific processes discussed above may be carried out in a wireless receiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the processes described above, or variants thereof. In some embodiments, these processing circuits may comprise customized hardware to carry out one or more of the functions described above. Other embodiments of the invention may include computer-readable devices, such as a programmable flash memory, an optical or magnetic data storage device, or the like, encoded with computer program instructions which, when executed by an appropriate processing device, cause the processing device to carry out one or more of the techniques described herein.

The invention disclosed herein may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of detecting the radio access technology employed in a received signal, said method comprising:
    acquiring from said received signal a plurality of energy measurements spaced in time and frequency, each energy measurement corresponding to one resource element of a time-frequency grid;
    accumulating said energy measurements into predetermined time-frequency bins to obtain cumulative energy measurements corresponding to each time-frequency bin; and
    identifying a radio access technology for said received signal based on a distribution of said cumulative energy measurements in said time-frequency bins.

2. The method of claim 1 wherein said time-frequency grid comprises multiple resource blocks of contiguous resource elements, and wherein accumulating said energy measurements into predetermined time-frequency bins comprises accumulating energy measurements corresponding to resource elements in different resource blocks into different resource block bins.

3. The method of claim 2 wherein identifying a radio access technology for said received signal comprises computing a variance of the cumulative energy measurements in said time-frequency bins and identifying said radio access technology from said variance.

4. The method of claim 3 wherein identifying said radio access technology from said variance comprises comparing said variance to a detection threshold.

5. The method of claim 3 further comprising normalizing said cumulative measurements to the variance of the received signal.

6. The method of claim 3 further comprising compensating said cumulative energy measurements for at least one of a delay spread of the received signal and a Doppler spread of the received signal.

7. The method of claim 1 wherein said time-frequency grid comprises multiple resource blocks of contiguous resource elements, and wherein accumulating said energy measurements into predetermined time-frequency bins comprises accumulating energy measurements corresponding to resource elements with the same frequency and time location in different resource blocks into different resource element bins.

8. The method of claim 7 wherein identifying a radio access technology for said received signal comprises computing a peak-to-minimum or a peak-to-average ratio and identifying said radio access technology from said ratio.

9. The method of claim 8 wherein identifying said radio access technology from said ratio comprises comparing said ratio to a detection threshold.

10. The method of claim 7 wherein identifying a radio access technology for said received signal comprises correlating peaks in said cumulative energy measurements to a known signal pattern in one of two or more possible radio access technologies.

11. The method of claim 1 wherein acquiring from said received signal a plurality of energy measurements comprises transforming said signal into frequency domain by a transform function to obtain said energy measurements.

12. A mobile communication device configured to detect the radio access technology associated with a received signal, said mobile communication device comprising:
    a transceiver circuit for communicating with a base station in a mobile communication network; and
    a control circuit for determining the radio access technology of a signal received by said transceiver circuit, said control circuit comprising a processor configured to:
        acquire from said received signal a plurality of energy measurements spaced in time and frequency, each energy measurement corresponding to one resource element of a time-frequency grid;
        accumulate said energy measurements into predetermined time-frequency bins to obtain cumulative energy measurements corresponding to each time-frequency bin; and
        identify the radio access technology of said received signal based on a distribution of said cumulative energy measurements in said time-frequency bins.

13. The mobile communication device of claim 12 wherein said time-frequency grid comprises multiple resource blocks of contiguous resource elements, and wherein the processor is configured to accumulate energy measurements corresponding to resource elements in different resource blocks into different resource block bins.

14. The mobile communication device of claim 13 wherein the processor is configured to compute a variance of the cumulative energy measurements in said time-frequency bins and to identify said radio access technology from said variance.

15. The mobile communication device of claim 14 wherein the processor is configured to identify said radio access technology by comparing said variance to a detection threshold.

16. The mobile communication device of claim 14 further comprising normalizing said cumulative measurements to the variance of the received signal.

17. The mobile communication device of claim 14 further comprising compensating said cumulative energy measurements for at least one of a delay spread of the received signal and a Doppler spread of the received signal.

18. The mobile communication device of claim 12 wherein said time-frequency grid comprises multiple resource blocks of contiguous resource elements, and wherein the processor is configured to accumulate energy measurements corresponding to resource elements with the same frequency and time location in different resource blocks into different resource element bins.

19. The mobile communication device of claim 18 wherein the processor is configured to identify a radio access technology for said received signal by computing a peak-to-minimum or a peak-to-average ratio and identifying said radio access technology from said ratio.

20. The mobile communication device of claim 19 wherein the processor is configured to identify said radio access technology by comparing said ratio to a detection threshold.

21. The mobile communication device of claim 7 wherein the processor is configured to identify the radio access technology by correlating peaks in said cumulative energy measurements to a known signal pattern in one of two or more possible radio access technologies.

22. The mobile communication device of claim 11 wherein the processor is configured to transform said signal into a frequency domain by a transform function to obtain said energy measurements.

* * * * *

UNITED STATES PATENT AND TRADEMARK OFFICE
CERTIFICATE OF CORRECTION

PATENT NO. : 8,498,640 B2  
APPLICATION NO. : 13/076599  
DATED : July 30, 2013  
INVENTOR(S) : Reial et al.

Page 1 of 1

It is certified that error appears in the above-identified patent and that said Letters Patent is hereby corrected as shown below:

In the Specification

In Column 4, Line 53, delete "WVDMA," and insert -- WCDMA --, therefor.

Signed and Sealed this  
Thirty-first Day of December, 2013

Margaret A. Focarino  
*Commissioner for Patents of the United States Patent and Trademark Office*